G. A. E. MELLIN.
ADJUSTABLE GEAR SHIFT LEVER FOR AUTOMOBILES AND THE LIKE.
APPLICATION FILED APR. 24, 1918.

1,283,852.

Patented Nov. 5, 1918.

Inventor:
Gustaf A. E. Mellin,
by Hazard and Miller
Atty's.

UNITED STATES PATENT OFFICE.

GUSTAF A. E. MELLIN, OF LOS ANGELES, CALIFORNIA.

ADJUSTABLE GEAR-SHIFT LEVER FOR AUTOMOBILES AND THE LIKE.

1,283,852.　　　　　Specification of Letters Patent.　　Patented Nov. 5, 1918.

Application filed April 24, 1918.　Serial No. 230,555.

*To all whom it may concern:*

Be it known that I, GUSTAF A. E. MELLIN, a citizen of the United States, residing at Los Angeles, in the county of Los Angeles and State of California, have invented new and useful Improvements in Adjustable Gear-Shift Levers for Automobiles and the like, of which the following is a specification.

My object is to make an improved gear shifting lever for automobiles, and my invention consists of the novel features herein shown, described and claimed.

Figure 1:
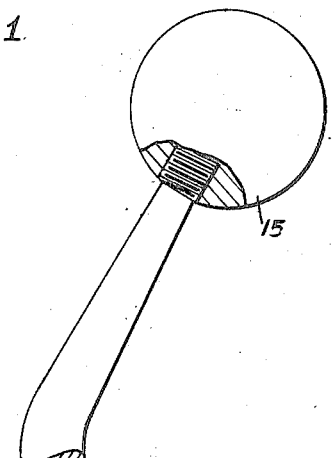
Figure 1 is a side elevation of a gear shifting lever embodying the principles of my invention parts being broken away and shown in section.

The transmission case cover has a hemispherical lever support 1, and a hemispherical cup 2 moves back and forth upon this support. A socket 3 extends upwardly from the cup 2. A shank 4 is fixed in the socket 3 and a ring 5 is formed integrally with the shank 4. The ring 5 has internal V-shaped clutching teeth 6 and a peripheral slot 7, the slot 7 extending from a point 45° on one side of a vertical line to a point 135° on the other side of the vertical line.

A clamping plate 8 has a flat lower face 9 and a curved toothed upper face 10, the teeth of the upper face fitting the teeth 6. An adjustable head 11 fits the periphery of the ring 5 and has a lug 12, fitting in the slot 7 so as to hold the head 11 in line. A socket 13 extends upwardly from the head 11. A lever arm 14 has a handle 15 upon its upper end and a screw thread 16 near its lower end and a second screw thread 17 upon its extreme lower end. A nut 18 is placed upon the screw thread 16 against the upper end of the socket 13. A set screw 19 is screw-seated through the wall of the socket 13 into a longitudinally extending slot 20 in the lever arm 14 and a nut 21 is placed upon the screw thread 17 against the clamping plate 8.

When the nut 21 is properly adjusted it needs no further attention. The nut 18 is loosened and the handle 15 manipulated to locate the handle in a convenient position for the driver of the automobile, and then the nut 18 is tightened to clamp the lever arm 14 rigidly to the ring 5 and hold the handle 15 in its adjusted position. The heads 22 and 23 are placed against the ends of the ring 5 and a bolt 24 is inserted through the heads at their axis to clamp the heads against the ring.

Figure 3:
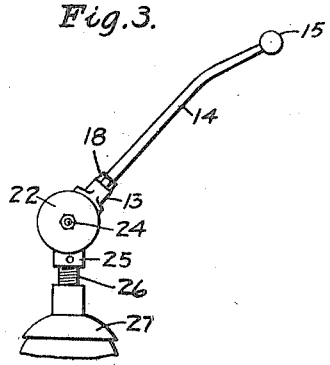
Fig. 3 is a side elevation on a reduced scale illustrating the operation and showing a slightly modified construction.
Figure 2:
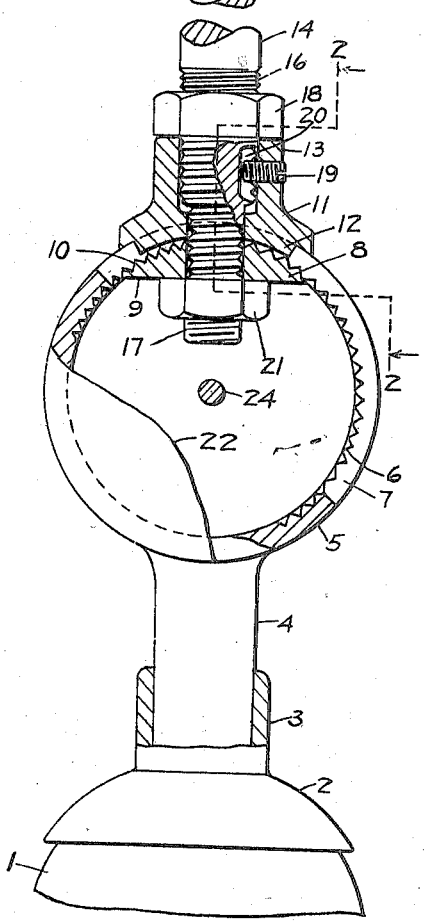
Fig. 2 is a fragmentary sectional detail on the line 2—2 of Fig. 1.
Figure 2:
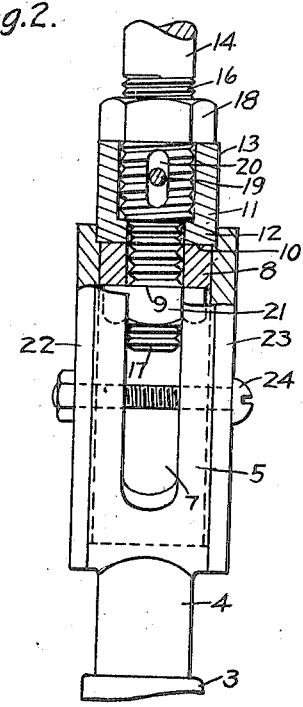

In the modification shown in Fig. 3 a socket 25 extends downwardly from the ring 5 and is removably mounted upon a stem 26, so that the device may be readily applied to a construction in which the shank or stem 26 is rigid with the cup 27.

Various changes may be made without departing from the spirit of my invention as claimed.

I claim:

1. In a gear shifting lever, a ring having internal gripping teeth and a peripheral slot, a clamping plate fitting against the gripping teeth, a head fitting the periphery of the ring, a lever arm having a screw-threaded end inserted through the head and through the clamping plate, means for holding the clamping plate upon the arm, and a nut upon the arm against the head, so that by loosening the nut the lever arm may be adjusted relatively to the ring and so that by tightening the nut the lever arm may be fixed in its adjusted position to the ring.

2. In a gear shifting lever, the combination with a gear shifting shank, of a ring formed integral with the upper end of the shank, the axis of the ring being at right angles to the axis of the shank, and the ring having a peripheral slot, a clamping plate fitting inside of the ring across the slot, a head fitting the periphery of the ring across the slot, a lever arm having a screw threaded end inserted through the head through the slot and through the clamping plate, a nut upon the lower end of the lever arm against the clamping plate and a nut upon the lever arm against the head, so that by manipulating the last nut the head may be clamped in an adjusted position to the ring.

3. In a gear shifting lever, a ring having internal gripping teeth and a peripheral slot, a clamping plate having external gripping teeth fitting against the internal gripping teeth, a head fitting the periphery of the ring, a lug extending from the head and fitting the peripheral slot, so that the head may slide upon the periphery of the ring in a line, a lever arm having a screw-threaded end inserted through the head and through the clamping plate, a nut upon the lower end of the lever arm against the clamping plate, a nut upon the lever arm against the head, and means for connecting the ring to a gear shifting stem.

4. In a gear shifting lever, the combination with a gear shifting shank pivotally mounted, of a ring upon the upper end of the shank, the axis of the ring being at right angles to the axis of the shank, and the ring being open at both sides and there being a peripheral slot through the ring, a clamping plate fitting inside the ring across the slot, a head fitting the periphery of the ring across the slot, a lever arm connecting the head and clamping plate together to grip the ring, and plates for closing the open sides of the ring.

In testimony whereof I have signed my name to this specification.

GUSTAF A. E. MELLIN.